US006430190B1

(12) United States Patent
Essbaum et al.

(10) Patent No.: US 6,430,190 B1
(45) Date of Patent: **\*Aug. 6, 2002**

(54) METHOD AND APPARATUS FOR MESSAGE ROUTING, INCLUDING A CONTENT ADDRESSABLE MEMORY

(75) Inventors: Alexander Dankwart Essbaum, Austin; Aubrey Deene Ogden, Round Rock, both of TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/848,681

(22) Filed: May 3, 2001

Related U.S. Application Data

(63) Continuation of application No. 08/976,402, filed on Nov. 21, 1997, now Pat. No. 6,236,658.

(51) Int. Cl.[7] ............................................... H04L 12/56
(52) U.S. Cl. ...................................................... 370/401
(58) Field of Search ................................. 370/389, 392, 370/401–406, 428, 397; 709/238, 242, 245

(56) References Cited

U.S. PATENT DOCUMENTS 5,521,913 A * 5/1996 Gridley ...................... 370/389

5,740,175 A * 4/1998 Wakeman et al. .......... 370/422

* cited by examiner

Primary Examiner—Chau Nguyen
Assistant Examiner—D. Trinh
(74) Attorney, Agent, or Firm—Cesari and McKenna, LLP (57) ABSTRACT

A router coupled to a plurality of networks receives a data packet from a first one of the networks and routes the data packet to a second one of the networks. The data packet includes a first portion having a destination network address. The router receives a first portion of the data packet, and the first portion of the data packet includes a destination network address. The destination network address of the data packet is asserted to a content addressable memory ("CAM"), where the CAM has stored routing information, while the first packet is not yet fully received from the first network. The CAM identifies one of the networks coupled to the router, in response to the destination network address being in the CAM, while the router is still receiving a remaining portion of the data packet. After identification of the destination network the data packet is routed to the destination network. However, in response to the destination network address not being in the CAM, the data packet is received completely, and a database searched for the destination network address, and the data packet is forwarded after the destination address is found in the database. The destination address may then be written into the CAM.

11 Claims, 6 Drawing Sheets

METHOD AND APPARATUS FOR MESSAGE ROUTING, INCLUDING A CONTENT ADDRESSABLE MEMORY

CROSS REFERENCE TO RELATED PATENT APPLICATIONS

This application is related to U.S. patent application Ser./No. 08/701,295, entitled "Cache for Improving Datagram Throughput in a Network Router", abandoned assigned to the assignee of this application, and a continuation of application Ser. No. 08/976,402, filed in Nov. 21, 1997, now U.S. Pat. No. 6,236,658.

FIELD OF THE INVENTION

This invention relates generally to message routing across interconnected networks, and more specifically may apply to such routing for messages on the internet.

BACKGROUND

Interconnected computer networks, such as the internet, are coupled together by routers. Such a computer network router is typically connected to two or more distinct networks. For a message sent from one network to another, destination network, the router receives the message, in the form of data packets, from one of the networks to which the router is connected, searches a database of routing information for determining to which of the connected networks the data packet should next be sent, so that the data packet can reach the destination network. The database of routing information can be quite large in networks, such as the internet, composed of many different interconnected networks. Therefore, searching the database may be relatively slow, in comparison with other aspects of data packet transmission, and a need consequently exists to speed up the searching.

SUMMARY

It is an object of the present invention to increase the rate of throughput for a router, by reducing the time required for finding routing information.

According to the present invention, the foregoing and other objects are attained by receiving a data packet from a first network, in a router coupled to a number of networks, and routing the data packet to a second one of the networks. A first portion of the data packet includes a destination network address. The destination network address for the packet is asserted to a content addressable memory ("CAM"), which identifies, while the router is still receiving a portion of the data packet, one of the networks coupled to the router and corresponding to the destination network.

In a further aspect, at least a portion of the data packet is stored, while the router is still receiving a portion of the data packet, in a buffer for sending to the identified one of the networks.

In yet another aspect, it will, of course, be understood that identifying such a network while the router is still receiving the data packet requires a very fast response by the CAM; and, therefore, the CAM can only identify such a network this quickly when the CAM already has the necessary routing information stored therein at the time the destination address is asserted to the CAM. (The necessary routing information consists of the destination network address of the data packet and the identity of the one of the networks coupled to the router and corresponding to the destination address of the data packet.) When the CAM does not have the necessary routing information stored therein at the time the destination network address of the data packet is input to the CAM, a processor searches a database to identify one of the networks coupled to the router and corresponding to the destination address of the data packet. In this later case, the data packet is not written to the buffer until after the router has received the entire data packet, since searching the database is relatively slow.

In a further aspect, the destination network address of the data packet and the corresponding identity of the one of the networks coupled to the router, which were found by searching the database, are stored in the CAM, so that the CAM will have this routing information for subsequent data packets. If necessary, because the CAM is full, an existing entry will be discarded from the CAM to make room for the new entry.

Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims. The invention is intended to be limited only as defined in the claims.

DETAILED DESCRIPTION

To clearly point out novel features of the present invention, the following discussion omits or only briefly describes conventional features of information processing systems which are apparent to those skilled in the art. It is assumed that those skilled in the art are familiar with CMOS circuit design, memory management, including virtual memory, processor scheduling, synchronization facilities for both processes and processors, message passing, ordinary device drivers, terminal and network support, system initialization and interrupt management.

A network, as the term is used herein, has a number of computers, commonly referred to in this context as "nodes", which communicate over a physical transmission media using a protocol supported by the network. For example, the Open Systems Interconnection reference model, defines how to connect communication devices such as computers in a seven layer model. In a transport layer of the OSI reference model, a transmission control protocol may be used, which formats messages in segments having a maximum of 64K bytes. In a network layer, an internet protocol may be used which transfers segments in data packets. Such a segment has a 32 bit network address in a header portion which precedes the data portion of the segment.

Figure 4:
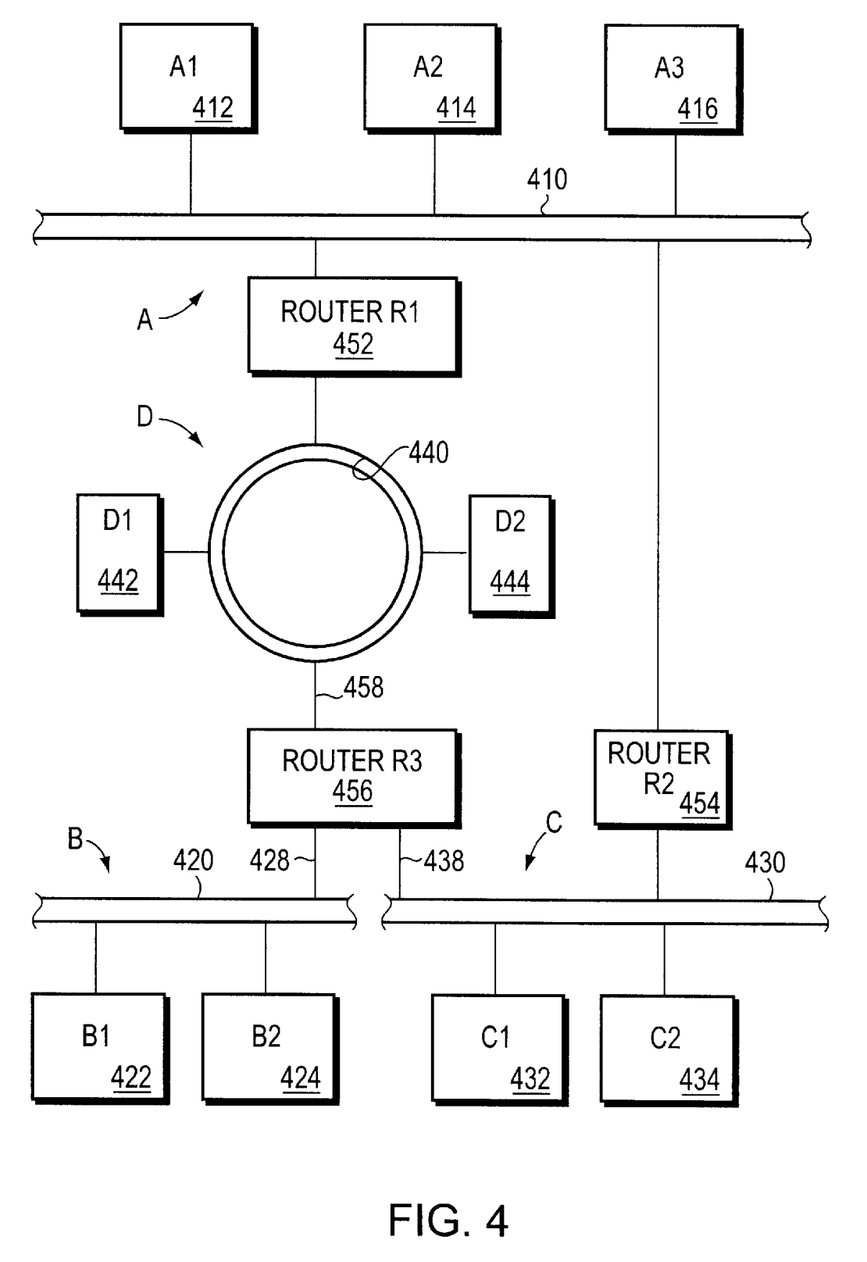
FIG. 4 is a block diagram of a network, consisting of a number of interconnected networks.

Referring first to FIG. 4, a block diagram of a network is shown, wherein four interconnected networks 410, 420, 430 and 440 are shown, having three routing nodes (i.e., "routers") 452, 454, and 456, and nine non-routing nodes 412, 414, 416, 422, 424, 432, 434, 442 and 444. (Of course, it should be understood that the network shown in FIG. 4 is merely illustrative of a network such as the internet which has a vast number of interconnected networks and routers.) The routers 452, 454, and 456 interconnect the networks 410, 420, 430 and 440. This is so that such a router may receive a data packet from one of the networks to which it is directly connected and send it to another one of the networks to which it is directly connected, in order for the data packet to get to its destination network.

Figure 1A:
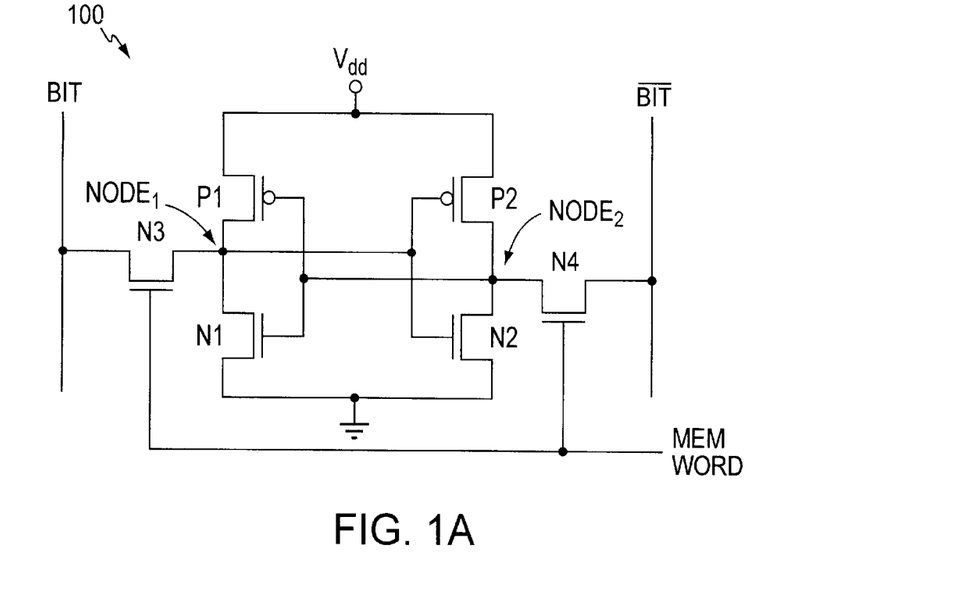
FIG. 1 illustrates schematics for a conventional memory cell, and a block of such memory cells for a CAM output block according to an embodiment for the present invention.
Figure 1B:
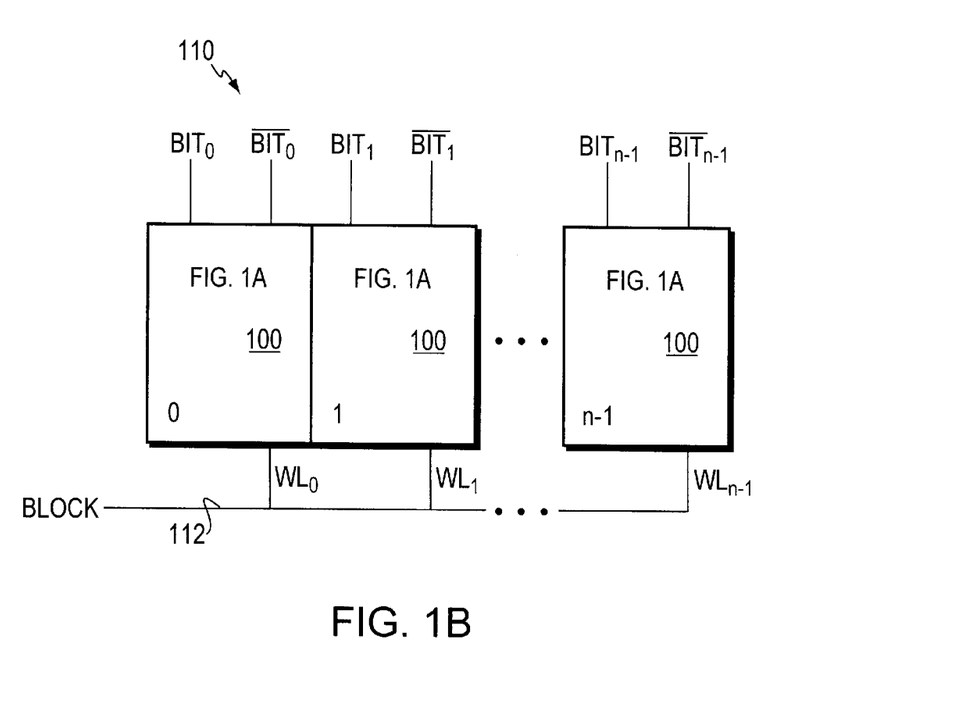

Referring now to FIG. 1, (A) illustrates a conventional memory cell 100, having transistors P1, P2, and N1 through N4 interconnected as shown, which may be used in an embodiment of the present invention for a CAM output memory cell, i.e. a memory cell directly coupled to a CAM cell. The memory cell 100 is addressed by asserting a signal on the memory word line. Reading and writing to/from the cell is through the true and complement bit lines. A block 110 of such memory cells 0 through n-1 are shown in (B) of FIG. 1, addressable by block line 112. This block may be used for storing n bits of data identifying a network coupled to the router, in an embodiment of the present invention for a block of memory cells in the CAM output.

Figure 2A:
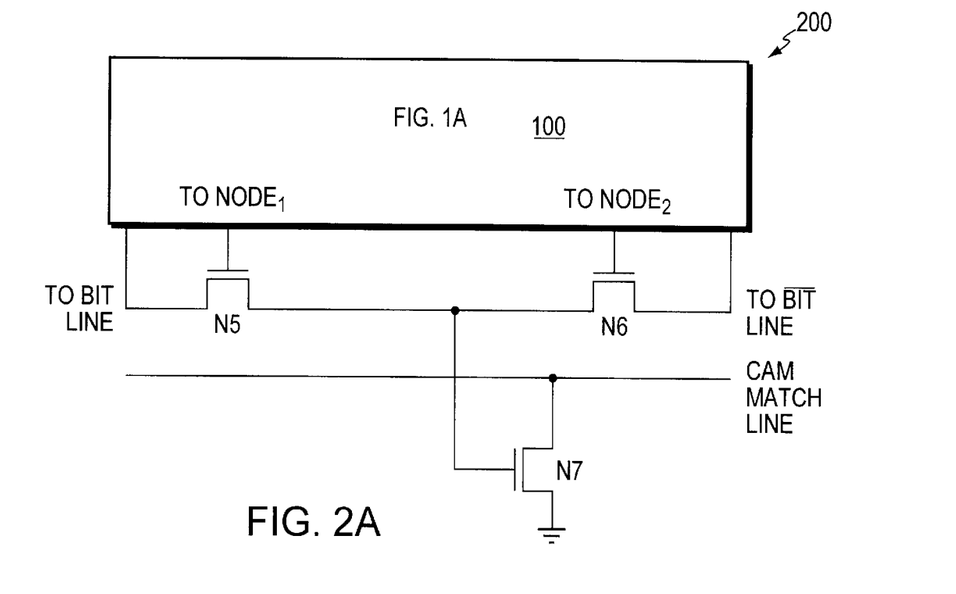
FIG. 2 illustrates schematics for a CAM input cell, and a block of such cells for a CAM input block according to an embodiment for the present invention.

Referring now to FIG. 2, in (A) is shown a schematic for a conventional CAM input cell 200, also addressable by the memory word line, and providing a match line for indicating that a bit asserted on the true and complement bit lines matches a bit stored in the cell 200. In (B) is shown a block 210 of such memory cells 0 through n-1, addressable by the line labelled "CAM Block", and providing a match line 212 for indicating that all the bits in cells 0 through n-1 match bits asserted on the true and complement bit lines to cells 0 through n-1. This block may be used for storing n bits of data identifying a destination network, in an embodiment of the present invention for a block of memory cells in the CAM output.

Figure 2B:
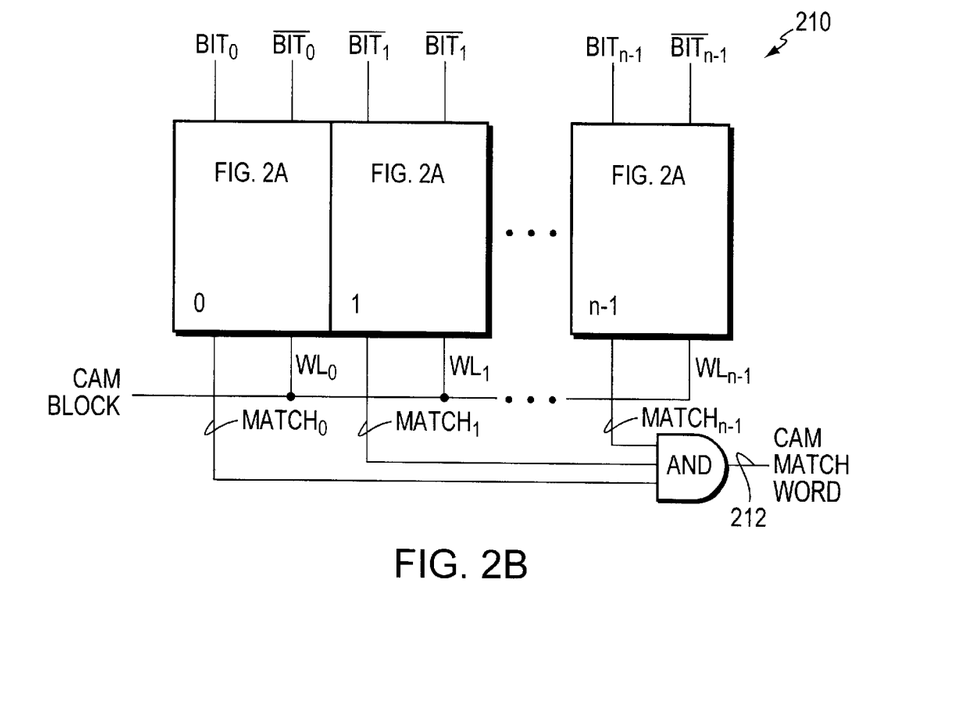
Figure 3:
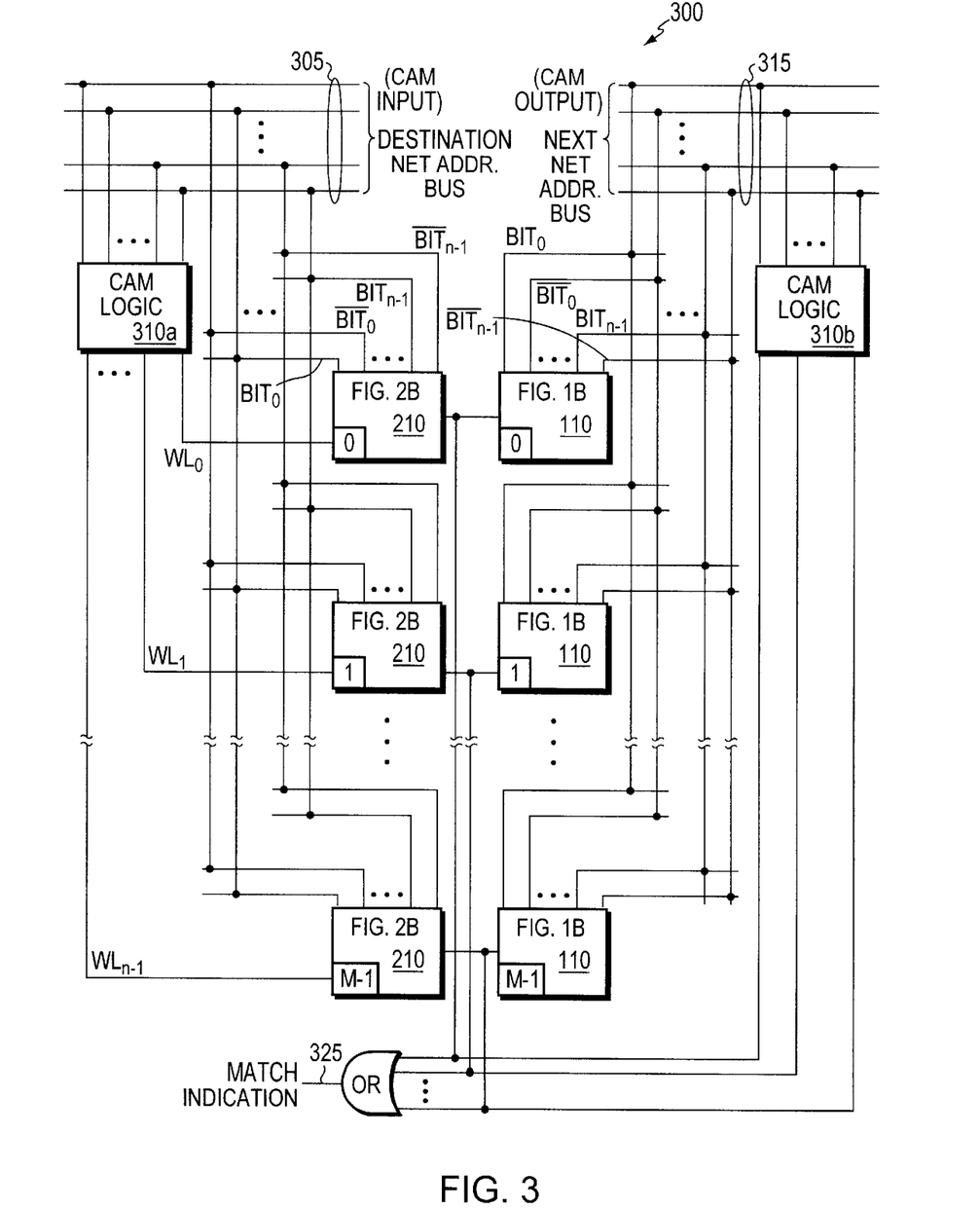
FIG. 3 provides an overall illustration of a CAM, including a number of the input and output blocks of FIGS. 1 and 2.

Referring now to FIG. 3, important aspects of a CAM are illustrated, for an embodiment of the present invention. The CAM has m input blocks 210 and output blocks 110, wherein an input block's match line (shown in FIG. 2(B)) is connected to the corresponding output block's block line 112 (shown in FIG. 1 (B)). The match lines for the input blocks are also connected to the input of an OR gate for generating a match indication on match line 325.

The first input block 210 (labelled block "0") is for storing a first destination network address. The first output block 110 (labelled block "0") is for storing a corresponding first network coupled directly to the router. That is, the first output block is for storing the identity (i.e., an address) of a network directly coupled to the router to which a data packet received by the router should be sent next, in the packet's path from one router to the next, in order for the packet to get to the destination network identified by the address stored in the first input block. Likewise, the second input block "1"is for storing a second destination network address, and the second output block "1" is for storing a corresponding second address for a network directly coupled to the router, and so on for m CAM input and output blocks.

The bit lines for the m input blocks 210 are connected to a CAM input bus 305, so that a destination network address can be input to the CAM on the bus 305 for comparing to existing addresses in the CAM input blocks (referred to also as "entries"). The bit lines for the m output blocks 110 are connected to a CAM output bus 315, so that the corresponding next network can be output by the CAM on the bus 315 in response to a destination address being input on the input bus 305 for comparing. In addition, the buses 305 and 315 are for initially writing the addresses for storing in the input and output blocks, respectively, under the control of CAM logic, two portions of which are shown as logic blocks 310*a* and 310*b*.

A computer system, such as an IBM RS/6000 computer system, may be interconnected to a number of networks and used as a router. Accordingly, in some aspects a router embodying the present invention may resemble such a computer system. However, the router of the embodiment will differ in other important aspects, as described herein.

Figure 5:
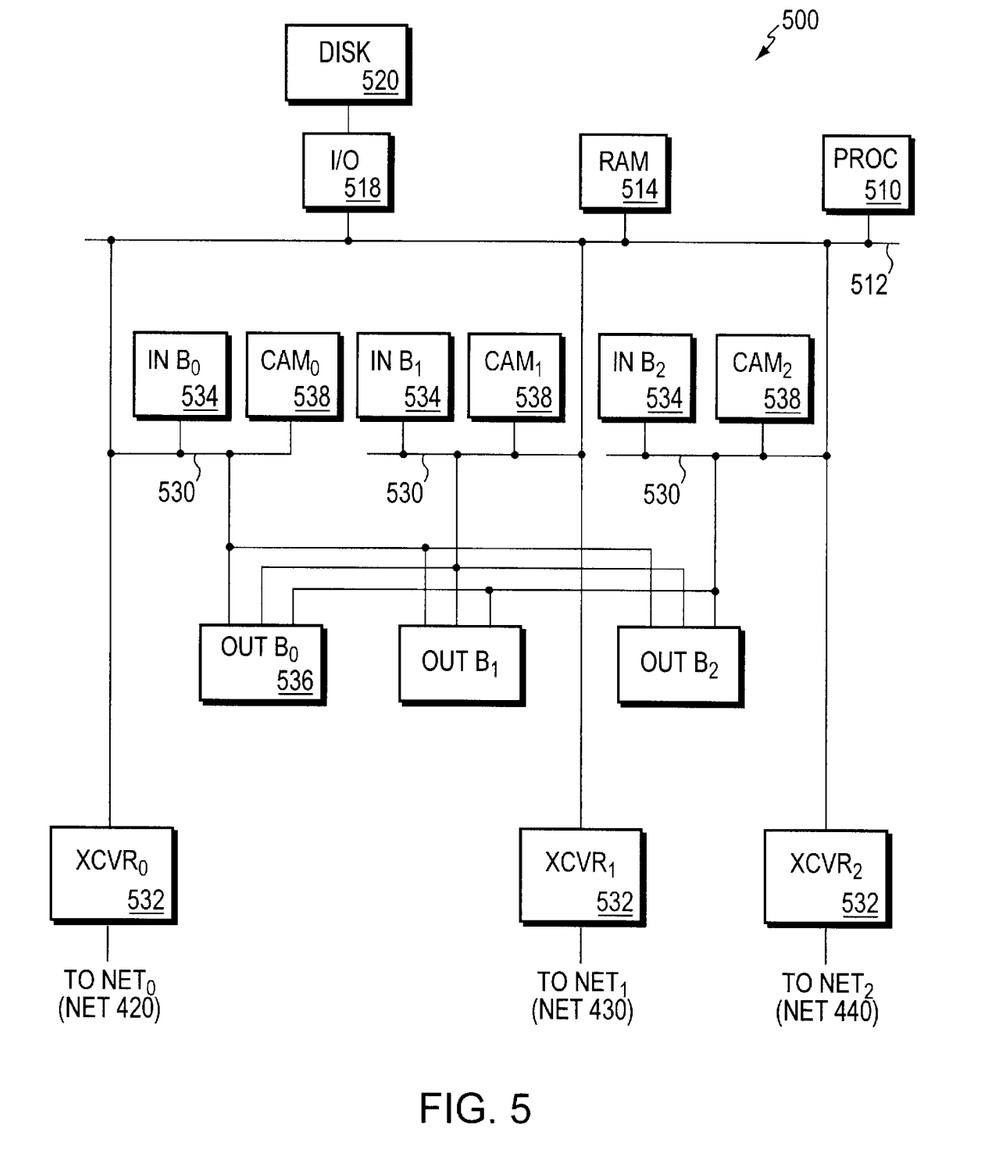
FIG. 5 is a block diagram of a router, such as router 456 in FIG. 4.

Referring to FIG. 5, a system 500 is shown which may be used for the router of the present invention. In this particular case, it is assumed for the sake of illustration, that the system 500 is used for the router 456 of FIG. 4. Therefore, three networks, labelled generally as N0, N1 and N2, are shown connected to system 500. The networks N0, N1 and N2 correspond to the networks 420, 430 and 440 connected to router 456, as shown in FIG. 4. It should be understood that a router such as illustrated in FIG. 5 could be connected to more or less than three networks, and that certain elements of the system 500 would be accordingly more or less numerous.

Central processing unit (CPU) 510 is provided, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is incorporated herein by reference. The CPU is coupled to various other components by system bus 512. Random access memory ("RAM") 514, I/O adapter 518, and transceivers 534 are also coupled to the system bus 512. I/O adapter 518 may be a small computer system interface ("SCSI") adapter, for example, that communicates with a disk storage device 520. Each transceiver 534 interconnects bus 512 with an outside network, enabling the system 500 to send and receive data packets. Also coupled to each transceiver 532 is a local bus 530, to which are coupled an input buffer 534, a multi-port output buffer 536 and a CAM 538.

Figure 6:
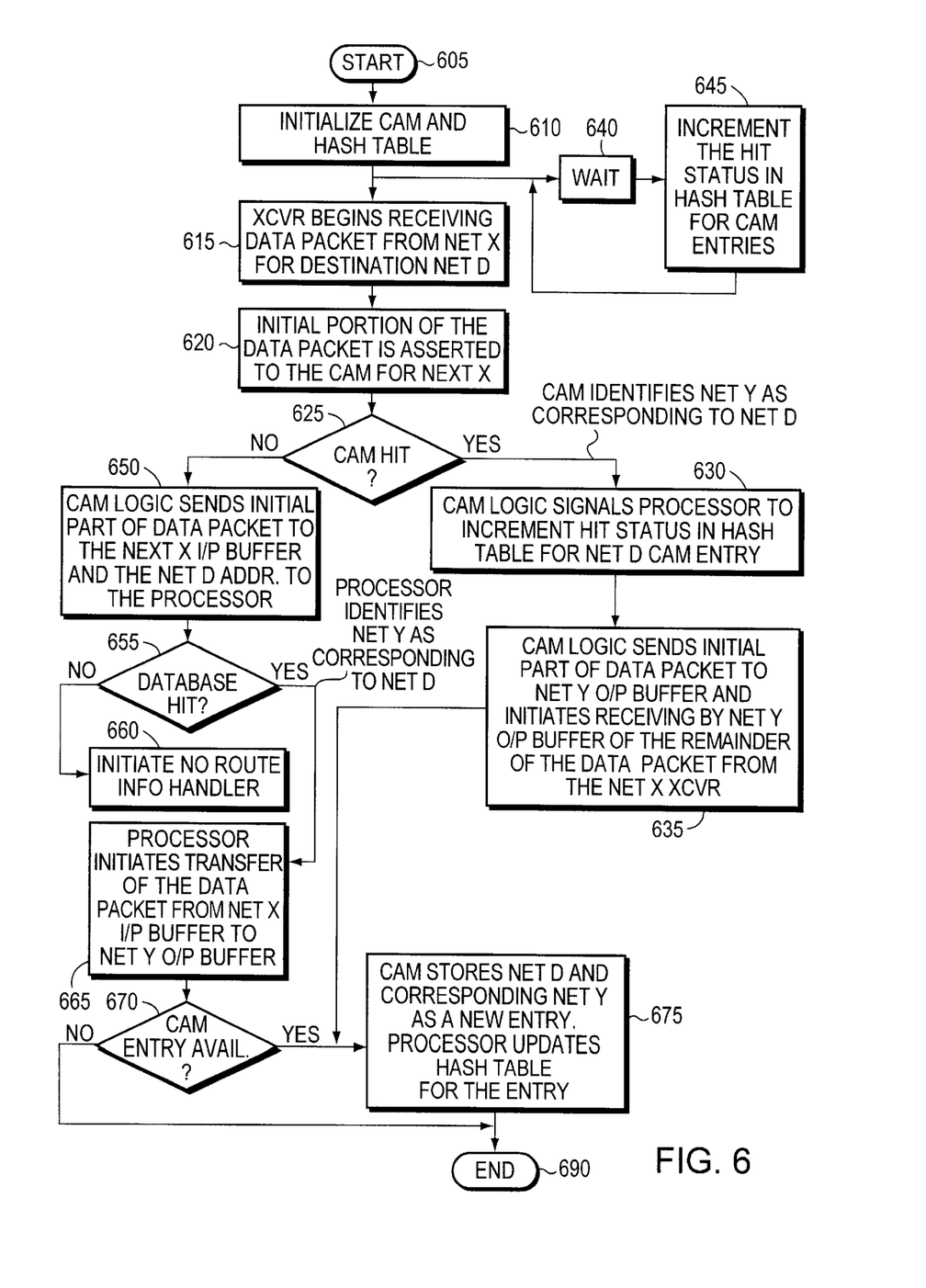
FIG. 6 is a flow chart for a method of practicing the present invention.

Referring now to the flow chart of FIG. 6, method steps are shown for a method embodiment of the present invention. Starting at 605, an initialization step follows at 610, wherein the CAM's 538 are loaded with routing information, as previously described, and hash tables are stored in RAM 514 or Disk 520 with an initial, user programmable value, X, of hit status for each of entries in each of the CAM's 538.

The hit status is used for keeping track of how frequently an entry is used, so that seldom used entries can be replaced with new entries when the CAM is full. Some of the CAM entries may alternatively be designated as permanent entries, wherein the entries will not be subject to removal because of infrequent hits. At 640 a user programmable wait is imposed, and then the processor decrements the hit status for each of the hash table entries for the non-permanent CAM entries. As will be described below, each time there is a CAM entry hit the corresponding hash table hit status entry will be incremented by a user programmable amount. In this manner the value of the hash table hit status entries provide an indication of how frequently each of the entries is accessed.

At 615, a transceiver 532, such as the transceiver 532 labeled "0" (being connected to network "0") receives network signals for a data packet from its network and converts the network signals to local signal logic levels. The transceiver asserts the data packet on its bus 530 at 620, which includes asserting the data packet header as an initial portion of the data packet.

Initially, only a small input buffer (not shown in FIG. 5) in the CAM 538 responds to the data packet. The CAM input buffer serves to store the incoming data packet for the brief time interval during which the CAM compares the destination address with the CAM entries. A typical CAM can do this comparison in about 2 to 5 nanoseconds, whereas a typical, relatively fast network transmits data at a rate of about 10 nanoseconds per bit. Therefore, the CAM input buffer will only need to store a small number of bytes of the data packet, at most, before the CAM resolves the routing, if the CAM has the necessary routing information to do so, or signals that the CAM cannot resolve the routing, if the CAM does not have the necessary routing information. It should also be understood that a data packet may be as big as 64K bytes. Therefore, typically only a very small portion of the overall data packet is received before the CAM responds to the data packet's destination address.

At 625, the network "0" CAM 538 indicates whether there is a destination network address match (also referred to as a "hit"). If there is a hit, then at 630 the network "0" CAM logic 310 signals processor 510 to increment the hit status for the CAM entry, by a user programmable amount K. Then, at 635, the CAM logic 310, sends the portion of the data packet stored in the small CAM buffer to the output buffer 536 for the network indicated by the CAM hit, i.e., the network coupled to the router to which the data packet should next be sent in order for the data packet to get to the destination network (referred to as the "network corresponding to the destination network"). For example, suppose the indicated network is network "2".

Also at 635, the CAM logic 310 also signals the network "2" output buffer 536 to begin receiving the data packet directly from the network "0" transceiver while the data packet is still being received from network "0". This obviates the need to store the data packet in the network "0" input buffer. It should be understood that a transceiver's input buffer is ordinarily dedicated to receiving data packets from the buffer's associated transceiver. Likewise, a transceiver's output buffer is ordinarily dedicated to queuing up data packets for sending by the buffer's associated transceiver. According to the present embodiment, however, a first output buffer 536 (the network "2" output buffer 536 in the example) may receive data packets directly from second output buffer's transceiver (the network "0" output buffer 536 in the example), under the control of the CAM logic 310 associated with the second output buffer. Thus, in the example, the network "0" input buffer is bypassed for the data packet received by the network "0" transceiver 532.

In a case where the destination address does not hit in the network "0" CAM 538, then at 650 the CAM logic 310 signals the processor 510, which may read the destination address in the input buffer 534, to look up routing information in a database which may be stored in RAM 514 or in disk storage 520.

Note that it is relatively slow to search such a large database, particularly since it is stored in memory for which access may be relatively slow, and since the search may have to wait for other searches. For example, it would not be unusual for a search to take longer than 100 microseconds. Thus, where a search takes this long the processor will ordinarily find the routing information only after the entire data packet has been received by the input buffer.

Even if search time were reduced such that the routing could be resolved more quickly, if a substantial portion of the data packet has been received by the time of resolving the routing much of the advantage of the present invention would not be realized, because at least that substantial portion would be stored in an input buffer and then transferred to the output buffer. For example, although resolving the routing through the use of a conventional cache may provide substantially improved resolution time in comparison to searching a database, a conventional cache is still much slower than the CAM of the present invention. In order to find the corresponding network for a given destination network using a conventional cache, each cache entry would be accessed by the processor and compared by the processor to the destination network address, until either a match is found or all entries in the cache have been accessed and compared. Thus, in a system of comparable speed to that described above, a single cache access and compare would require substantially more time than the CAM compare. Furthermore, it would be typical to have to access and compare numerous cache entries before a conclusion is reached (i.e. a match is found or the entire cache has been accessed), whereas for the CAM only a single compare operation is conclusive. Furthermore, the processor, which has to perform the cache accesses and compares for the conventional cache, generally has other tasks, so that it does not execute the cache accesses and compares in an uninterrupted sequence. This further slows down routing resolution. In contrast, according to the present invention, the routing is resolved so quickly by the CAM that substantially all of the data packet can stored directly in the output buffer, while only a few bytes have to be stored in the buffer associated with the CAM and then transferred to the output buffer.

At 655 it is determined whether the processor found the routing information in the database. If the routing information is not found, the "no routing info" handler is initiated at 660. If found, then at 665 the processor initiates transfer of the data packet from the network "0" input buffer to the network "2" output buffer.

At 670 the processor checks hit status entries in the hash table to find a candidate entry for replacement in the CAM. Then, at 675, the CAM stores the routing information that was found by the processor in step 655, in place of the entry identified by the processor at step 670. Also at 670, the processor puts an entry in the hash table for the new CAM entry.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Although the present invention and its advantages have been described in detail, it should be understood that various changes, substitutions and alterations can be made without departing from the spirit and scope of the invention as defined by the following claims.

What is claimed is:

1. A method, in a router coupled to a plurality of networks, for receiving a data packet from a first one of the networks and routing the data packet to a second one of the networks, the method comprising the steps of:

a) receiving a first portion of a data packet, where the first portion of the data packet includes a destination network address;

b) asserting the destination network address of the data packet to a content addressable memory ("CAM")

which has stored routing information, while the packet is not yet fully received from the first network;

c) identifying, by the CAM while the router is still receiving a remaining portion of the data packet, one of the networks coupled to the router and corresponding to the destination network, in response to the destination network address being in the CAM;

d) routing the data packet, in response to the destination network address being in the CAM, to the destination network;

e) receiving the data packet completely in response to the destination network address not being in the CAM, and searching a database for the destination network address, and forwarding the data packet after the destination address is found; and, f) tracking with a hash table how frequently an entry in the CAM is used, and dropping those CAM entries which are seldom used.

2. The method of claim 1, further comprising:

storing at least a portion of the data packet, while the router is still receiving a portion of the data packet, in a buffer for sending to the identified one of the networks.

3. The method of claim 1, further comprising:

storing in the CAM, in response to the destination network address not being in the CAM and the destination network address being found in the search of a database, the destination network address of the data packet.

4. A computer readable media having instructions to execute in a processing unit for practice of the method of claim 1 written thereon.

5. Electromagnetic signals propagating over a computer network, said electromagnetic signals carrying information including instructions to execute in a processing unit for the practice of the method of claim 1.

6. A method, in a router coupled to a plurality of networks for receiving a data packet from a first one of the networks and routing the data packet to a second one of the networks, the method comprising the steps of:

a) starting to receive a data packet, wherein a first portion of the data packet includes a destination network address;

b) asserting the destination network address of the packet from the first portion of the data packet to a content addressable memory ("CAM") input;

c) identifying, by the CAM while the router is still receiving a remaining portion of the data packet, a match in one of the networks coupled to the router and corresponding to the destination network, in response to the destination network address being input to the CAM;

d) if a match cannot be found, initiating a processor to find from a database a new match corresponding to the destination network;

e) storing the new match in the CAM;

f) tracking with a hash table how frequently an entry in the CAM is used, and dropping those CAM entries which are seldom used.

7. A router coupled to a plurality of networks for receiving a data packet from a first one of the networks and routing the data packet to a second one the networks, the router comprising:

a transceiver to receive a data packet, wherein the data packet includes a first portion having a destination network address;

a content addressable memory ("CAM") connected to the router and having network router address information stored therein;

an input block to input the destination network address to the CAM, while the data packet is not fully received and the transceiver is still receiving a portion of the data packet, so that in response to the destination network address being in the CAM, the CAM identifies one of the networks coupled to the router corresponding to the destination address of the data packet while the transceiver is still receiving a portion of the data packet;

memory to receive the data packet completely in response to the destination network address not being in the CAM, and searching a database for the destination network address, and forwarding the data packet after the destination address is found;

a hash table to track how frequently an entry in the CAM is accessed; and circuits to drop from the CAM those entries which are seldom accessed.

8. The router of claim 7 further comprising:

circuits to write the destination network address into the CAM, in response to the destination address being found in searching the database.

9. The router of claim 7, further comprising:

control logic responsive to the CAM for directing the data packet to the network identified by the CAM, so that an output buffer begins receiving the data packet while the receiving means is still receiving a portion of the data packet.

10. The router of claim 7, further comprising:

an input buffer for receiving a data packet from the receiving means;

data storage means for storing a computer program and a database of network routing information;

a processor for searching the database in response to the network address not being in the CAM to identify a network coupled to the router corresponding to the destination address of the data packet, after the entire data packet has been stored in the input buffer.

11. A router coupled to a plurality of networks for receiving a data packet from a first one of the networks and routing the data packet to a second one of the networks, the router comprising:

receiving means for receiving a data packet, wherein the data packet includes a first portion having a destination network address;

content addressable memory ("CAM") connected to the router and having network router address information stored therein;

means for inputting the destination network address of the packet to the CAM, while the data packet is not fully received and the receiving means is still receiving a portion of the data packet, so that the CAM identifies one of the networks coupled to the router corresponding to the destination address of the data packet while the receiving means is still receiving a portion of the data packet;

means for receiving the data packet completely in response to the destination network address not being in the CAM, and searching a database for the destination network address, and forwarding the data packet after the destination address is found; and means for tracking with a hash table how frequently an entry in the CAM is accessed, and means to drop from the CAM those entries which are seldom accessed.

* * * * *